United States Patent [19]

Fine

[11] Patent Number: 4,789,073

[45] Date of Patent: Dec. 6, 1988

[54] INSULATED, DISPLAY BEVERAGE CONTAINER CONSTRUCTION

[75] Inventor: Neil H. Fine, Northbrook, Ill.

[73] Assignee: Neil Enterprises, Inc., Chicago, Ill.

[21] Appl. No.: 3,858

[22] Filed: Jan. 16, 1987

[51] Int. Cl.[4] .......................... A47J 4/00; B65D 25/54; B65D 8/06

[52] U.S. Cl. .......................... 215/13.1; 40/324; 220/82 R; 220/410

[58] Field of Search .......................... 220/410, 82 R; 215/12 R, 13.1; 40/324

[56] References Cited

U.S. PATENT DOCUMENTS

| | | | |
|---|---|---|---|
| 2,895,636 | 7/1959 | Martin | 220/410 |
| 3,355,046 | 11/1967 | Jolly | 215/13.1 |
| 3,765,559 | 10/1973 | Saney | 220/410 |
| 4,047,633 | 9/1977 | Trombly | 220/82 R |

FOREIGN PATENT DOCUMENTS

| | | | |
|---|---|---|---|
| 632006 | 12/1961 | Canada | 220/410 |
| 921830 | 3/1963 | United Kingdom | 215/12 R |
| 1021252 | 3/1966 | United Kingdom | 215/13 R |
| 1281534 | 7/1972 | United Kingdom | 215/13 R |

*Primary Examiner*—George E. Lowrance

*Attorney, Agent, or Firm*—Dick and Harris

[57] ABSTRACT

An improved construction for an insulated beverage container having a sealed display chamber for the enclosed display of indicia such as advertising or small objects which avoids the need for gluing or sonic welding of the components thereof to achieve a moisture-tight seal therebetween sufficient to withstand the temperature and pressures encountered in automatic dishwashers. In the preferred embodiment the moisture-tight seal is achieved by creating a snap-tight fit between the liner and shell of the container so as to provide a barrier to the migration of moisture into the display chamber.

4 Claims, 1 Drawing Sheet

INSULATED, DISPLAY BEVERAGE CONTAINER CONSTRUCTION

BACKGROUND OF THE INVENTION

The present invention relates in general to an improved insulated beverage container construction and in particular to such a construction having an internal beverage containing chamber and a sealed display chamber for display of internally contained indicia.

While insulated beverage container devices have previously existed which have enabled enclosed display of advertising or decorative materials positioned therein, such devices have not satisfactorily addressed the problem of providing an easy snap-together type construction, while providing sufficient liquid-tight sealing of the display chamber so as to withstand pressurized washing thereof as in an automatic dishwasher by preventing the undesired migration of moisture into the display chamber. Such accumulation of moisture within the display chamber is especially undesired in a beverage container due to the environment for germ, bacteria or mildew growth created therein, in close proximity to the portion of the container coming in contact with the mouth of the user. In addition, the undesired entry of moisture into the display chamber not only ruins the aesthetic appearance qualities of the beverage container by damaging the material being displayed, but also reduces the thermal insulating qualities of the container since such moisture would serve to conduct thermal energy from the outer shell into the inner liner and vice versa.

Prior devices that have attempted to address this problem of effectively sealing the display chamber from moisture, have done so by using permanent adhesive or sonic welding to permanently affix the inner liner to the outer shell. However, the use of adhesives or sonic welding increases the amount of time, effort and associated tools or machinery necessary to assemble the insulated beverage containers with the displayed materials contained therein. In addition, such permanent gluing or sonic welding of the components of the insulated container effectively prevents access to the display chamber, or the materials displayed therein, once they are assembled.

Accordingly, the present invention has as one of its objects, the provision of a construction enabling dishwashersafe, moisture-tight sealing of the display chamber of the insulated beverage container.

It is further an object of the present invention to enable such dishwasher safe, moisture-tight sealing of the display chamber of the insulated beverage container, without the need for gluing or sonic welding of the components thereof or use of the requisite tools and machinery associated therewith.

Another object of the present invention is to provide a beverage container construction enabling facilitated detachment of the components thereof to provide access to the interior of the display chamber thereof, without decreasing the ability of such components to provide the requisite degree of sealing therebetween when reassembled.

Yet another object of the present invention is the provision of a structure and construction which minimizes the costs and effort associated with a manufacture thereof.

These and other objects of the invention will become apparent in light of the present specification, drawings and claims.

SUMMARY OF THE INVENTION

This invention comprises an improved, insulated beverage container construction having an internal beverage containing chamber and which also enables sealed display of internally contained indicia such as advertising materials and the like. The construction comprises an outer shell having a substantially open top portion which is circumscribed by substantially vertical side walls having a top edge and which define a substantially hollow interior. The construction further comprises an inner liner having side walls surrounding the beverage containing chamber. The side walls of the inner liner are telescopically received within the interior of the outer shell in nested fashion. In addition, interlocking means are operably associated with the outer shell and the inner liner so as to operably secure the outer shell to the inner liner and thereby provide a moisture penetration barrier resulting in a liquid-tight seal therebetween without the need for either sonic welding or gluing thereof. This enables the container to maintain the aforementioned liquid-tight seal between the inner liner and the outer shell when the container is subjected to pressurized water as in an automatic dishwasher.

The present invention can further comprise an indicia display chamber interposed between the exterior face of the inner liner and the interior face of the side walls of the shell for display of the indicia materials therewithin. The liner of the invention can also be detachably mounted to the outer shell so as to provide access to the indicia display chamber.

In the preferred embodiment, the interlocking means comprises protruding tab means positioned along the outer periphery of the liner means and tab reception means operably aligned with the protruding tab means along the outer periphery of the outer shell so as to receive the protruding tab means. The protruding tab means of the preferred embodiment comprises the inner liner means having overhanging lip means proximate the top thereof and serving to saddle the top edge of the outer shell means, as well as an inwardly projecting protruding bead extending along the inner periphery of the overhanging lip means. The tap reception means of the preferred embodiment comprises a first protruding band extending about the outer periphery of the outer shell means and a second protruding band positioned below the first band and extending about the outer periphery of the outer shell, so as to define a groove between the two bands for secure receipt of the protruding bead of a liner between the first and second bands and thereby provide a barrier to the migration of water between the liner means and the outer shell means.

The outer shell means of the preferred embodiment comprises a container having a substantially circular cross section, substantially vertical side walls and a substantially flat bottom surface. In the preferred embodiment, the liner means comprises a fluid receptacle having a substantially circular cross-section and downwardly converging side walls. The liner means further has a substantially flat bottom surface and the top edge thereof being curved downwardly so as to define the overhanging lip means.

DETAILED DESCRIPTION OF THE DRAWINGS

Figure 1:
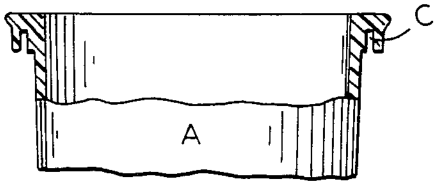
FIG. 1 (PRIOR ART)
FIG. 1 is a side, partial cross-sectional view of a prior art insulated beverage container inner liner.
Figure 2:
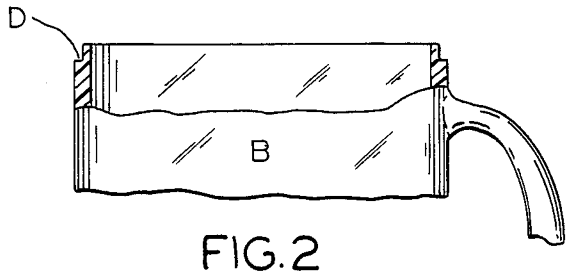
FIG. 2 (PRIOR ART)
FIG. 2 is a side, partial cross-sectional view of a prior art insulated beverage container outer shell.

While this invention is susceptible of embodiment in many different forms, they are shown in the drawings and will herein be described in detail, one specific embodiment, with the understanding that the present disclosure is to be considered as an exemplification of the principles of the invention and is not intended to limit the invention to the embodiments illustrated. The preferred embodiment and configuration of the beverage container construction of the present invention 10 is shown in FIGS. 3–7. The prior art construction for such beverage containers enabling sealed display of internally contained indicia and insulated containment of beverages is shown in FIGS. 1 and 2. As shown in FIGS. 1 and 2, conventional liner A is provided with notch C which receives edge D of conventional shell B, when liner A is nested within shell B in the prior art device. However, in such prior art devices the inclusion of an adhesive between notch C and edge D, or sonic welding along edge D is required in order to provide secure affixation of liner A to shell B as well as a substantially fluid-tight seal around the internal chamber between liner A and shell B.

Figure 3:
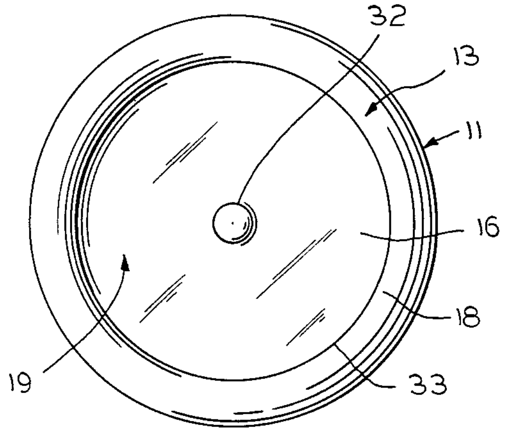
FIG. 3 is a top plan view of the inner liner means 11 of the preferred embodiment.
Figure 5:
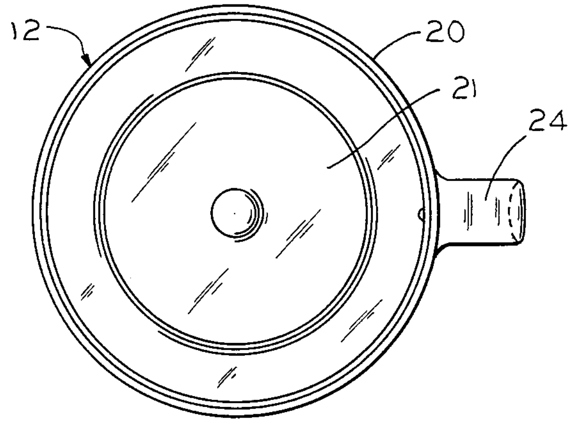
FIG. 5 is a top plan view of outer shell means 12 of the preferred embodiment.
Figure 4:
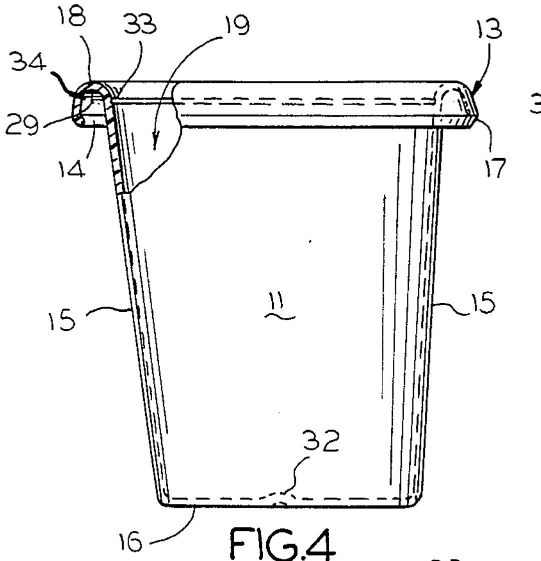
FIG. 4 is a side, partial cross-sectional view of liner means 11 of the preferred embodiment.
Figure 6:
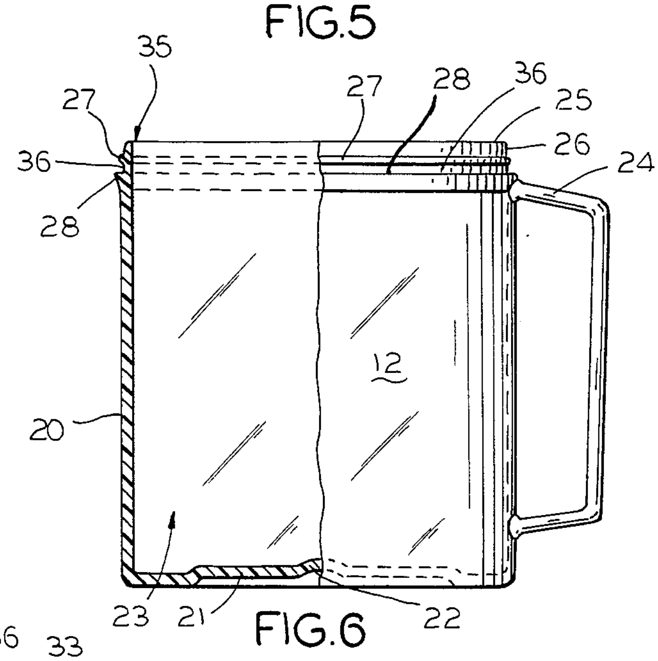
FIG. 6 is a side, partial, cross-sectional view of outer shell means 12 of the preferred embodiment.
Figure 7:
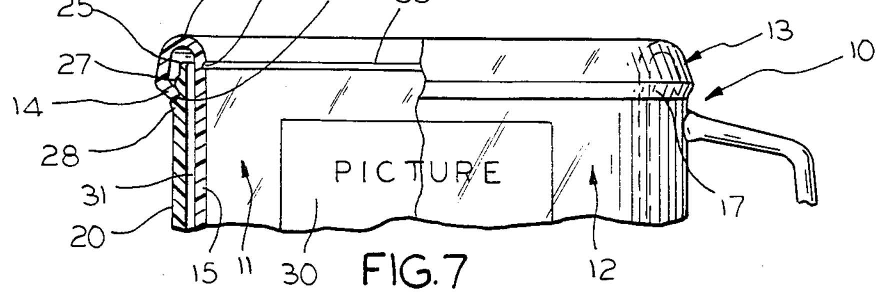
FIG. 7 is a side, partial cross-sectional view of the preferred embodiment of container 10 in the assembled condition and showing indicia 30 being displayed therein.

As shown in FIGS. 3–7, the preferred embodiment of the present invention employs an inner liner means 11 telescopically received within the hollow interior 23 of outer shell means 12. Top views of liner means 11 and shell means 12 are shown in FIGS. 3 and 5, respectively. As shown in FIG. 7, gap 31 comprising the display chamber, is provided between outer shell means 12 and inner liner means 11 among other reasons, in order to provide a greater degree of thermal insulation of the beverage within liner means 11 with respect to the ambient temperature, than if liner means 11 and outer shell means 12 were in actual contact along a substantial portion of their lengths. As shown in FIG. 4, liner means 11 of the preferred embodiment possesses overhanging lip portion 13 at its top region and substantially flat bottom surface 16 containing raised portion 32 approximately at its center.

Liner means 11 further employs downwardly converging side walls 15 and in the preferred embodiment possesses a substantially circular cross section, which decreases in cross-sectional area in the downward direction as viewed in FIG. 4. Overhanging lip portion 13 of liner means 11 commences proximate the top edge 33 of side walls 15 and extends outwardly and upwardly to top surface 18 and then curves downwardly from top surface 18, so as to have a substantially inverted U-shaped cross-section in the preferred embodiment. The outside bottom portion of overhanging lip portion 13 ends with inwardly pointing ledge 17, as seen in FIGS. 4 and 7. The underside 29 of over-hanging lip portion 13 is provided with a wide enough gap between liner means side wall 15 and lip means inner wall 34, so as to enable overhanging lip means 13 to straddle the top edge portion 35 of outer shell means 12, in a manner to be described in greater detail hereinbelow. The top outer surface 18 of overhanging lip means 13 is provided in the preferred embodiment as a substantially uniformly smooth curvilinear surface and serves as the beverage drinking surface when the assembled beverage container is used in the conventional manner. Other configurations of overhanging lip means 13, such as those that include an integrated pour spout or the like, as well as other overall configurations of liner means 11 are also contemplated.

Liner means interior 19, as shown in FIGS. 3 and 4, comprises the hollow interior chamber used to contain the beverage, when the beverage container is in the assembled position as shown in FIG. 7. Overhanging lip means 13 of liner means 11, further employs and inwardly (with respect to the interior 19 of liner means 11) and slightly downwardly projecting, protruding bead 14 which in the preferred embodiment extends continuously about the bottom, inner surface of inner wall 34 of ledge 17. Protruding bead 14 on the inside of ledge 17 of liner means 11, is securely received and engaged by outer shell 12, when liner 11 and shell 12 are assembled, so as to provide a moisture penetration barrier between liner 11 and shell 12 in a manner to be described in greater detail hereinbelow.

As shown in FIG. 6, outer shell means 12, in the preferred embodiment, possesses substantially vertical side walls 20 and conventional integrated handle 24. Outer shell means 12 possesses bottom surface 21 having raised portion 22 proximate its center and possesses a substantially uniform circular cross section in the preferred embodiment. In the preferred embodiment raised portion 32 of liner 11 is located above raised portion 22 of shell 12. The side walls 20 and bottom surface 21 of outer shell means 12 define a hollow interior 23 enabling nested or telescopic receipt of liner means 11, as well as sealed enclosure and display of indicia materials 30 therebetween as shown in FIG. 7. With respect to FIG. 6, top portion 35 of outer shell means 12 is open so as to enable receipt of liner means 11 therethrough. Open top portion 35 of outer shell means 12 further includes top edge 25, first recessed region 26, first protruding band 27, groove 36 and second protruding band 28. In the preferred embodiment, outer shell means 12 is made of a substantially clear or translucent material so as to enable viewing of the displayed materials therethrough. However, liner means 11 can be provided in any one of a variety of colors or of a clear material, as desired.

In the preferred embodiment, both liner means 11 and outer shell means 12 are constructed of a plastic material, through the use of other liquid-impervious and insulating materials is contemplated as being within the scope of the present invention. However, the material selected should also be capable of withstanding the temperatures and pressure encountered in mechanical washing devices such as automatic dishwashing machines. Plastic liner means 11 and other shell means 12 of the preferred embodiment are formed through injection molding or other such similar process. While the preferred embodiment of the present invention employs a liner and shell having substantially circular cross-sections, other configurations which accommodate the requisite sealed nesting thereof should also be considered to be within the scope of the present invention.

As shown in FIG. 7, when beverage container 10 is assembled, in the preferred embodiment, by placing liner means 11 into the interior 23 of outer shell means 12, through open top portion 35 of outer shell means 12 in nested fashion, inwardly protruding bead 14 of ledge 17 is securely received between first protruding band 27 and second protruding band 28 of outer shell means 12, within groove 36 formed therebetween, and without any gaps therebetween which would enable moisture to migrate therethrough. Such attachment of the liner means 11 to the outer shell means 12 results in the formation of enclosed display chamber 31 comprising the space between side walls 15 of liner means 11 and the inner surface of side walls 20 of outer shell means 12, between bottom inner surface of overhanging lip means 13 of liner 11 and bottom surface 21 of outer shell 12. Materials which fit within such display chamber 31 such as pictures, photographs, symbols, advertising materials or other such physical objects can be maintained therein for aesthetic display or storage purposes.

The above-described attachment of liner means 11 to outer shell means 12 provides a liquid-tight seal between over-hanging lip means 13 of liner means 11 and the top portion 35 of outer shell means 12, by providing a physical, moisture penetration barrier therebetween serving to prevent the undesired entry of seepage of liquids into the display chamber during the process of washing beverage container 10 by immersion or exposure to pressurized water and soap as in an automatic dishwasher. Such undesired entry of moisture into display chamber 31 would not only ruin the aesthetic appearance qualities of the beverage container 10 by damaging the advertising material 30 therein, but would also create the undesired consequences associated with possible mildew, bacteria or germ accumulation and growth within such a non-sealed moisture containing chamber and the risk of transfer thereof due to its close proximity to the portion of container 10 coming in contact with the mouth of the user. The presence of such undesired liquids within display chamber 31 further serves to diminish the insulating properties of container 10. Such liquid-tight sealing of the display chamber is achieved in the present invention without the need for gluing or sonic welding of liner means 11 to outer shell means 12.

The interlocking nature of protruding bead 14 securely surrounded by first protruding band 27 and second protruding band 28, within groove 36, serves to securely attach liner means 11 to outer shell means 12, by means of the "snap-fit" caused thereby. If access to chamber 31 is desired, after liner means 11 and outer shell means 12 are in an assembled position as shown in FIG. 7, liner means 11 can be pulled out of outer shell means 12, by application of sufficient force (in an upward direction as viewed in FIG. 7) to dislodge protruding bead 14 from groove 36 without damaging the future sealing capabilities thereof.

With respect to FIGS. 4, 6 and 7, in order to assemble container 10, side walls 15 of liner means 11 are inserted within hollow interior 23 of shell means 12. A downward force is then applied to overhanging lip portion 13 of sufficient magnitude to cause protruding bead 14 of ledge 17 to be securely lodged between protruding bands 27 and 28 within groove 36 formed therebetween.

While in the preferred embodiment bead 14 and bands 27 and 28 are formed of the same materials as liner means 11 and shell means 12, respectively, alternative embodiments of the present invention could include bead 14 and, bands 27 and 28 being separately formed of a resilient rubber material or the like so as to provide the above-described sealing effect.

The foregoing description and drawings merely explain and illustrate the invention and the invention is not limited thereto, except insofar as the appended clams are so limited, as those skilled in the art having the disclosure before them will be able to make modifications and variations therein without departing from the scope of the invention.

What is claimed is:

1. An improved insulated beverage container construction having an internal beverage containing chamber and enabling sealed display of internally contained indicia, said improved, insulated beverage container construction comprising:

outer shell means having a substantially open top portion circumscribed by substantially vertical side walls, each said side wall having a top edge, said side walls defining a substantially hollow interior region, a first protruding bead positioned upon an outer surface of said outer shell means and extending circumferentially around and outwardly from said side walls parallel to said top edges, a second protruding bead positioned upon said outer surface and exending circumferentially around and outwardly from said side walls parallel and proximate to said first protruding band, said first and second protruding beads thereby forming a groove;

liner means having a substantially open top portion circumscribed by substantially vertical side walls defining said beverage containing chamber, said liner means including overhanging lip means operably disposed adjacent said substantially open top portion of said liner means, said overhanging lip means including a collar portion extending from said substantially open top portion outwardly of said side walls of said liner means and curving inwardly toward said side walls, said collar portion having an inwardly protruding bead extending circumferentially along a lower portion thereof; and said liner means being telescopically insertable into and receivable by said outer shell means, whereupon the outer surfaces of said outer shell means describe therebetween an indicia display chamber for the positioning of said internally contained indicia;

said overhanging lip means capable of telescopically receiving said top edges of said side walls of said outer shell, said inwardly protruding bead being securely, interlockingly, and detachably engaged between said first and second protruding beads of said outer shell means and received by said groove to provide for the secure releasable retention of said liner means by said outer shell and further providing a shielded, liquid-tight seal against the penetration of moisture into said display chamber when said container is subjected to pressurized water, as in an automatic dishwasher, without the necessity of sonic welding or cementing said inwardly protruding bead into said groove.

2. The invention according to claim 1 in which the outer shell means is fabricated, at least partly, of a substantially clear or translucent material so as to enable viewing of said internally contained indicia.

3. The invention according to claim 1 wherein said outer shell means comprises a container having a substantially circular cross-section and a substantially flat bottom surface.

4. The invention according to claim 1 wherein said liner means comprises:

a fluid recepticle having a substantially circular cross-section and downwardly converging side walls;

said recepticle further having a substantially flat bottom surface; and the top edge of said recepticle being curved downwardly so as to define said overhanging lip means.

* * * * *

UNITED STATES PATENT AND TRADEMARK OFFICE
CERTIFICATE OF CORRECTION

PATENT NO. : 4,789,073

DATED : December 6, 1988

INVENTOR(S) : Neil H. Fine

It is certified that error appears in the above-identified patent and that said Letters Patent is hereby corrected as shown below:

| | |
|---|---|
| Col. 1, Line 32 | After "shell" delete "into" and insert instead --to-- |
| Col. 2, Line 47 | After "The" delete "tap" and insert instead --tab-- |
| Col. 5, Line 32 | After "entry" delete "of" and insert instead --or-- |
| Col 6, Line 12 | After "appended" delete "clams" and insert instead --claims-- |
| Col 6, Line 56 | After "indicia" delete ";" and insert instead --,-- |
| Col 6, Line 33 | After "surface and" delete "exending" insert instead --extending-- |
| Col 6, Line 53 | After "surfaces" insert --of said side walls of said liner means and the inner surfaces-- |

Signed and Sealed this

Twenty-third Day of April, 1991

*Attest:*

HARRY F. MANBECK, JR.

*Attesting Officer* | *Commissioner of Patents and Trademarks*